(12) United States Patent
Mednik (10) Patent No.: US 11,444,535 B2
(45) Date of Patent: Sep. 13, 2022

(54) DC-DC CONVERTER WITH IMPROVED LINE TRANSIENT REJECTION

(71) Applicant: Microchip Technology Incorporated, Chandler, AZ (US)

(72) Inventor: Alexander Mednik, Campbell, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 79 days.

(21) Appl. No.: 17/198,911

(22) Filed: Mar. 11, 2021

(65) Prior Publication Data
US 2022/0200453 A1    Jun. 23, 2022

Related U.S. Application Data

(60) Provisional application No. 63/129,867, filed on Dec. 23, 2020.

(51) Int. Cl.
*H02M 3/158* (2006.01)
*H02M 1/088* (2006.01)
*H02M 1/00* (2006.01)

(52) U.S. Cl.
CPC ......... *H02M 3/158* (2013.01); *H02M 1/0019* (2021.05); *H02M 1/0022* (2021.05); *H02M 1/0025* (2021.05); *H02M 1/088* (2013.01); *H02M 1/0009* (2021.05)

(58) Field of Classification Search
CPC .. H02M 3/158; H02M 1/0019; H02M 1/0022; H02M 1/0025
See application file for complete search history.

(56) References Cited

U.S. PATENT DOCUMENTS

| 2010/0207594 A1* | 8/2010 | Davoudi ............... H02M 3/157 323/283 |
| 2014/0239925 A1 | 8/2014 | Tanabe et al. |
| 2021/0099080 A1* | 4/2021 | Chen ................... H02M 3/1582 |

FOREIGN PATENT DOCUMENTS

TW    I695572 B    6/2020

OTHER PUBLICATIONS

International Search Report dated Aug. 31, 2021 for related PCT Application No. PCT/US2021/030152.

* cited by examiner

*Primary Examiner* — Adolf D Berhane
*Assistant Examiner* — Afework S Demisse
(74) *Attorney, Agent, or Firm* — Burr & Forman LLP; Ryan M. Corbett (57) ABSTRACT

An emulated peak current mode control (EPCMC) synchronous buck converter device is provided, and may include a converter having an inductor, a high-side switch, and a low-side switch, and an EPCM controller. The controller may include a PWM latch to alternately turn on and off the high-side and low-side switches, a current sense element to output a current sense voltage based on the inductor current, and a feedforward circuit to generate a feedforward voltage. The current sense element outputs a first current sense voltage while the low-side switch is turned on, and outputs a second current sense voltage while the low-side switch is turned off. The feedforward voltage is generated based on a voltage differential that represents a difference between the first current sense voltage and the second current sense voltage, and the PWM latch alternately turns on and off the high-side and low-side switches based on the feedforward voltage.

21 Claims, 9 Drawing Sheets

DC-DC CONVERTER WITH IMPROVED LINE TRANSIENT REJECTION

CROSS-REFERENCE TO RELATED APPLICATION

This application claims the benefit of U.S. Provisional Patent Application No. 63/129,867, filed on Dec. 23, 2020, which is incorporated herein by reference in its entirety.

TECHNICAL FIELD

The present disclosure generally relates to DC-DC power converters and more particularly to DC-DC power converters using emulated peak current mode control architecture to provide a power supply output that is less sensitive to supply line voltage disturbances.

BACKGROUND

Many automotive and industrial applications of DC-DC power converters are characterized by severe supply line voltage disturbances. When a DC-DC converter powers a noise-sensitive system, it is highly desirable that the supply line transients do not propagate to the power supply output. Peak current mode control (PCMC) is known for its good power supply rejection due to the inherent input voltage feedforward.

Figure 1:
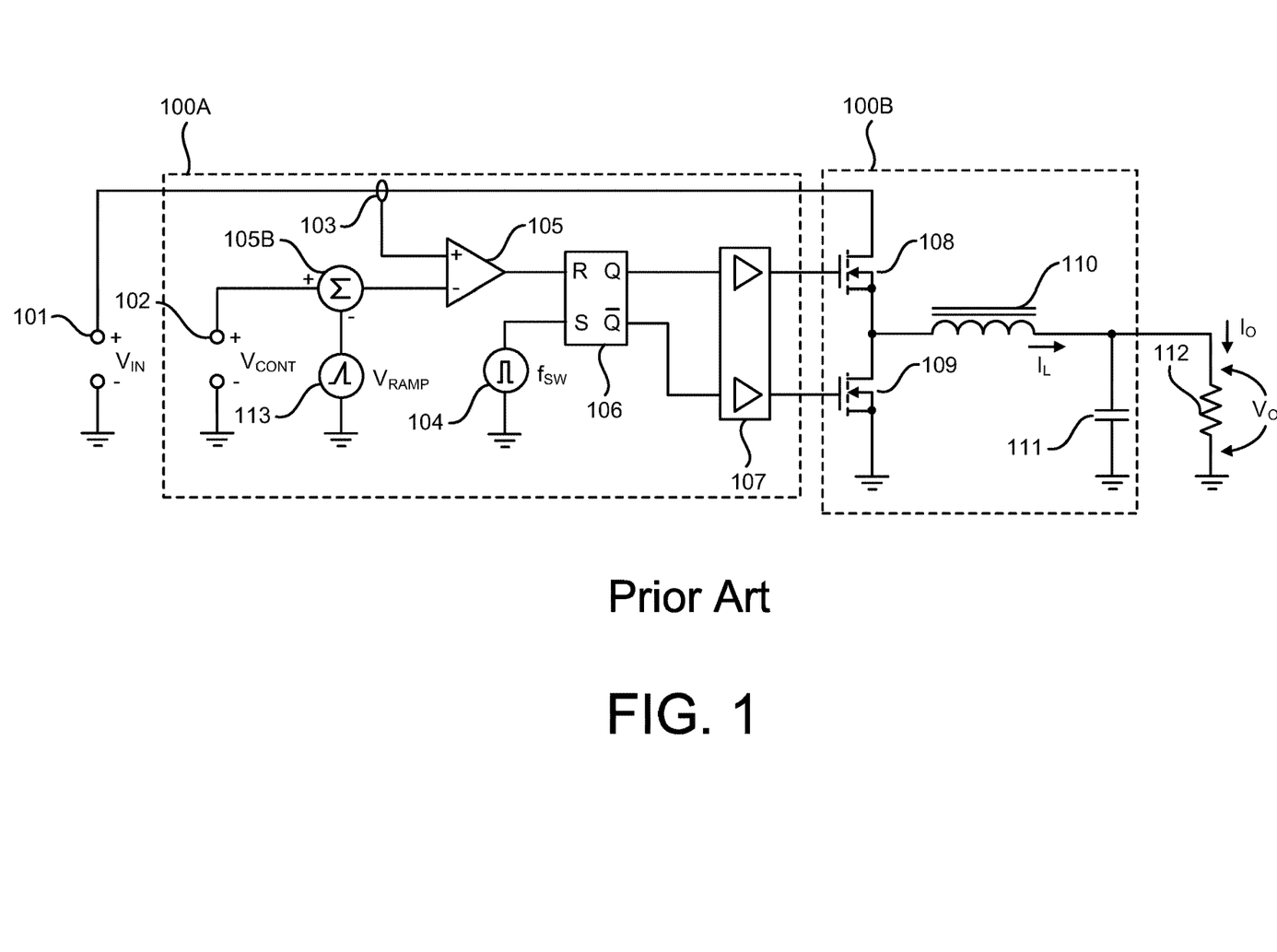
FIG. 1 shows a PCMC synchronous buck converter device according to the prior art.

FIG. 1 shows a prior art PCMC synchronous buck converter device configured to receive a DC input voltage $V_{IN}$ from an input voltage source 101 and regulate an output voltage $V_O$ at a load 112. The PCMC synchronous buck converter device of FIG. 1 includes a converter 100B, which includes a high-side switch 108, a low-side switch 109, an inductor 110, and a smoothing capacitor 111. The converter device further includes a controller 100A, which includes gate driver 107, a pulse width modulation (PWM) latch 106, implemented as an RS flip-flop, an oscillator circuit 104 configured to generate a series of clock pulses, a current sense comparator 105, a difference circuit 105B, a current sense element 103, a current control command voltage $V_{CONT}$ source 102, and a slope compensation ramp voltage $V_{RAMP}$ generator 113. The current sense element 103 monitors current $I_L$ in the inductor 110 when the high-side switch 108 conducts. Upon the PWM latch 106 receiving a clock signal from the oscillator circuit 104, the low-side switch 109 turns off, and the high-side switch 108 turns on, charging the inductor 110. The current sense element 103 outputs a current sense voltage that is provided to a non-inverting input of the current sense comparator 105. Difference circuit 105B receives the slope compensation ramp voltage $V_{RAMP}$ and the current control command voltage $V_{CONT}$ and outputs the difference between them, which is a threshold voltage that is provided to an inverting input of the current sense comparator 105. When the current sense voltage exceeds the threshold voltage, the current sense comparator 105 outputs a control signal that resets the PWM latch 106, which causes the high-side switch 108 to turn off, and the low-side switch 109 to turn on.

It is well known that optimal selection of the slew rate of the slope compensation ramp voltage $V_{RAMP}$ can achieve substantially zero susceptibility to input supply disturbances. However, this approach has shown to be extremely sensitive to variation in the values of the inductor 110 and the current sense element 103, and, therefore, may not be practical. Moreover, selection of the slew rate of the slope compensation ramp voltage $V_{RAMP}$ based on this criterion may yield underdamped performance of the current loop.

Applications characterized by a wide range of supply voltage, i.e. a wide range of DC input voltage $V_{IN}$, sometimes use emulated current mode control where the current sense voltage is replaced by an artificial ramp. In such a converter, the current sense voltage is sampled in a previous switching cycle and used as the initial condition for the emulated ramp in the next cycle. Emulated peak current mode control (EPCMC) with valley current sampling features the same inherent supply rejection property as PCMC.

Figure 2:
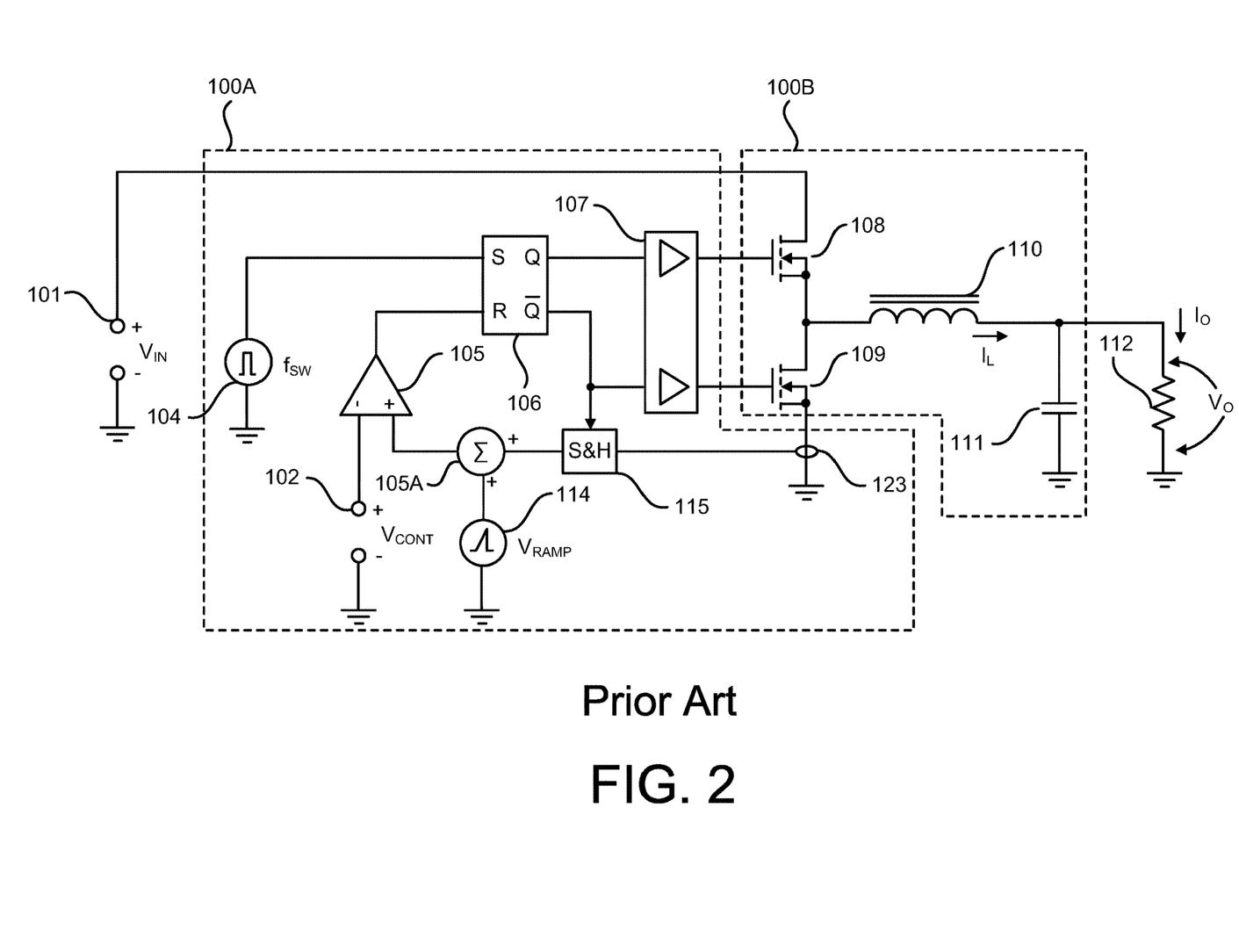
FIG. 2 shows an EPCMC synchronous buck converter device according to the prior art.

FIG. 2 shows a prior art EPCMC synchronous buck converter device. Unlike the PCMC synchronous buck converter device of FIG. 1, controller 100A of the EPCMC synchronous buck converter device of FIG. 2 includes a current sense element 123 having a gain $R_i$, a first sample-and-hold circuit 115, a ramp voltage $V_{RAMP}$ generator 114, and a summation circuit 105A, and does not include current sense element 103. The current sense element 123 is configured to monitor current $I_L$ in the inductor 110 when the low-side switch 109 conducts. The current sense element 123 outputs a current sense voltage, which is sampled by the first sample-and-hold circuit 115 at the end of the conduction time interval of the low-side switch 109. Summation circuit 105A sums the sampled current sense voltage and the ramp voltage $V_{RAMP}$ generated by ramp voltage $V_{RAMP}$ generator 114, and current sense comparator 105 compares the resulting sum of the sampled current sense voltage and the ramp voltage $V_{RAMP}$ with the control command voltage $V_{CONT}$.

Similar to the PCMC synchronous buck converter device of FIG. 1, the slew rate of the ramp voltage $V_{RAMP}$ can selected to achieve substantially zero susceptibility to disturbances in the input supply voltage $V_{IN}$. However, this approach suffers the same deficiencies as the converter of FIG. 1, specifically dependency on the gain $R_i$ of the current sense element 123 and the value of the inductor 110. Considering that the EPCMC synchronous buck converter device of FIG. 2 is targeted for applications characterized by wide input voltage range and severe supply line disturbances, a controller is desired that is capable of overcoming these deficiencies and yielding a practical EPCMC synchronous buck converter device.

SUMMARY

According to an aspect of one or more exemplary embodiments, there is provided an emulated peak current mode control (EPCMC) synchronous buck converter device that may include a converter configured to receive an input voltage and generate an output voltage. The converter may include an inductor, a high-side switch, and a low-side switch, wherein the high-side switch and the low-side switch may be coupled to, and configured to control an inductor current through, the inductor. The EPCMC synchronous buck converter device may also include an emulated peak current mode (EPCM) controller having a pulse width modulation (PWM) latch configured to turn alternately on and off the high-side and low-side switches, a current sense element configured to output a current sense voltage based on the inductor current through the inductor, and a feedforward circuit configured to generate a feedforward voltage. The current sense element may output a first current sense voltage at a first time while the low-side switch is turned on, and may output a second current sense voltage at a second time that is delayed from the first time, but still during the conduction period of the low-side switch. The feedforward circuit may generate the feedforward voltage based on a voltage differential that represents a difference between the first current sense voltage and the second current sense voltage. The PWM latch may be configured to alternately turn on and off the high-side and low-side switches, respectively, based on the feedforward voltage.

The EPCM controller may also include a ramp voltage generator configured to generate a ramp voltage, a current control command voltage source configured to generate a current control command voltage, and a current sense comparator that compares a sum of the ramp voltage and the second current sense voltage with a sum of the feedforward voltage and the current control command voltage, and outputs a control signal to the PWM latch based on the comparison. The PWM latch may be configured to alternately turn on and off the high-side and low-side switches, respectively, based on the control signal output by the current sense comparator.

The EPCM controller may also include a multiplier-divider circuit configured to multiply the voltage differential by a ratio of the output voltage to the input voltage, and a gain stage configured to amplify an output of the multiplier-divider circuit to generate the feedforward voltage.

The EPCM controller may also include a feedforward difference circuit configured to output a difference between the voltage differential and the voltage differential multiplied by a ratio of the output voltage to the input voltage. The gain stage may be configured to amplify the difference between the voltage differential and the output of the multiplier-divider circuit to generate the feedforward voltage.

The EPCM controller may also include a first sample-and-hold circuit configured to sample the first current sense voltage at the first time and output a first sampled current sense voltage, a second sample-and-hold circuit configured to sample the second current sense voltage at the second time and output a second sampled current sense voltage, a current sense difference circuit configured to output the voltage differential as the difference between the first sampled current sense voltage and the second sampled current sense voltage, and a delay circuit configured to delay the sampling of the second current sense voltage by a time delay period following the sampling of the first current sense voltage.

According to an exemplary embodiment, the EPCM controller may include a multiplier-divider circuit configured to multiply the voltage differential by a ratio of the output voltage to the input voltage, a feedforward difference circuit configured to subtract the voltage differential from the output of the multiplier-divider circuit, and a gain stage configured to amplify the difference between the voltage differential and the output of the multiplier-divider circuit to generate the feedforward voltage.

The EPCM controller may also include an oscillator circuit configured to generate a series of clock pulses, and the delay circuit may include a frequency divider configured to receive the series of clock pulses and generate a first frequency tap signal corresponding to a first clock pulse of the series of clock pulses, and a second frequency tap signal corresponding to a second clock pulse of the series of clock pulses. The first sample-and-hold circuit may be configured to sample the first current sense voltage in response to the first frequency tap signal, and the second sample-and-hold circuit may be configured to sample the second current sense voltage in response to the second frequency tap signal.

According to an aspect of one or more exemplary embodiments, there is provided an emulated peak current mode (EPCM) controller for controlling a synchronous buck converter configured to receive an input voltage and generate an output voltage, the synchronous buck converter having an inductor, a high-side switch, and a low-side switch. The EPCM controller may include a pulse width modulation (PWM) latch configured to alternately turn on and off said high-side and low-side switches, a current sense element configured to output a current sense voltage based on the inductor current through the inductor, and a feedforward circuit configured to generate a feedforward voltage. The current sense element may output a first current sense voltage at a first time while the low-side switch is turned on, and may output a second current sense voltage at a second time that is delayed from the first time, but still during the conduction period of the low-side switch. The feedforward circuit may generate the feedforward voltage based on a voltage differential that represents a difference between the first current sense voltage and the second current sense voltage. The PWM latch may be configured to alternately turn on and off the high-side and low-side switches based on the feedforward voltage.

The EPCM controller may also include a ramp voltage generator configured to generate a ramp voltage, a current control command voltage source configured to generate a current control command voltage, and a current sense comparator that compares a sum of the ramp voltage and the second current sense voltage with a sum of the feedforward voltage and the current control command voltage, and outputs a control signal to the PWM latch based on the comparison. The PWM latch may be configured to alternately turn on and off the high-side and low-side switches based on the control signal output by the current sense comparator.

The EPCM controller may also include a multiplier-divider circuit configured to multiply the voltage differential by a ratio of the output voltage to the input voltage, and a gain stage configured to amplify an output of the multiplier-divider circuit to generate the feedforward voltage.

The EPCM controller may also include a first sample-and-hold circuit configured to sample the first current sense voltage at the first time and output a first sampled current sense voltage, a second sample-and-hold circuit configured to sample the second current sense voltage at the second time and output a second sampled current sense voltage, a current sense difference circuit configured to output the voltage differential as the difference between the first sampled current sense voltage and the second sampled current sense voltage, and a delay circuit configured to delay the sampling of the second current sense voltage by a time delay period following the sampling of the first current sense voltage.

According to an exemplary embodiment, the EPCM controller may include a multiplier-divider circuit configured to multiply the voltage differential by a ratio of the output voltage to the input voltage, a feedforward difference circuit configured to subtract the voltage differential from the output of the multiplier-divider circuit, and a gain stage configured to amplify the difference between the voltage differential and the output of the multiplier-divider circuit to generate the feedforward voltage.

The EPCM controller may also include an oscillator circuit configured to generate a series of clock pulses, and the delay circuit may include a frequency divider configured to receive the series of clock pulses and generate a first frequency tap signal corresponding to a first clock pulse of the series of clock pulses, and a second frequency tap signal corresponding to a second clock pulse of the series of clock pulses. The first sample-and-hold circuit may be configured to sample the first current sense voltage in response to the first frequency tap signal, and the second sample-and-hold circuit may be configured to sample the second current sense voltage in response to the second frequency tap signal.

According to an aspect of one or more exemplary embodiments, there is provided an emulated peak current mode control (EPCMC) method of controlling a synchronous buck converter configured to receive an input voltage and generate an output voltage, and having an inductor, a high-side switch, and a low-side switch. The method may include generating a pulse width modulation (PWM) signal to alternately turn on and off the high-side and low-side switches, respectively, outputting a first current sense voltage based on an inductor current through the inductor at a first time while the low-side switch is turned on, outputting a second current sense voltage based on the inductor current through the inductor at a second time that is delayed from the first time, but still during the conduction period of the low-side switch, and generating a feedforward voltage based on a voltage differential that represents a difference between the first current sense voltage and the second current sense voltage. The PWM signal may be generated based on said feedforward voltage.

The method may also include generating a ramp voltage, generating a current control command voltage, comparing a sum of the ramp voltage and the second current sense voltage with a sum of the feedforward voltage and the current control command voltage, and outputting a control signal based on the comparison. The PWM signal may be generated based on said control signal.

The method may also include multiplying the voltage differential by a ratio of the output voltage to the input voltage, and amplifying a result of the multiplying step to generate the feedforward voltage.

The method may also include sampling the first current sense voltage at the first time and outputting a first sampled current sense voltage, and sampling the second current sense voltage at the second time and outputting a second sampled current sense voltage. The method may include outputting the voltage differential as the difference between the first sampled current sense voltage and the second sampled current sense voltage. Sampling the second current sense voltage may be delayed by a time delay period following the sampling of the first current sense voltage.

According to an exemplary embodiment, the method may include multiplying the voltage differential by a ratio of the output voltage to the input voltage, subtracting the voltage differential from a result of the multiplying step, and amplifying a result of the subtracting to generate the feedforward voltage.

The method may also include generating a series of clock pulses, generating a first frequency tap signal corresponding to a first clock pulse of the series of clock pulses, and generating a second frequency tap signal corresponding to a second clock pulse of the series of clock pulses. The sampling of the first current sense voltage may include sampling the first current sense voltage in response to the first frequency tap signal, and the sampling of the second current sense voltage may include sampling the second current sense voltage in response to the second frequency tap signal.

DETAILED DESCRIPTION OF EXEMPLARY EMBODIMENTS

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 3:
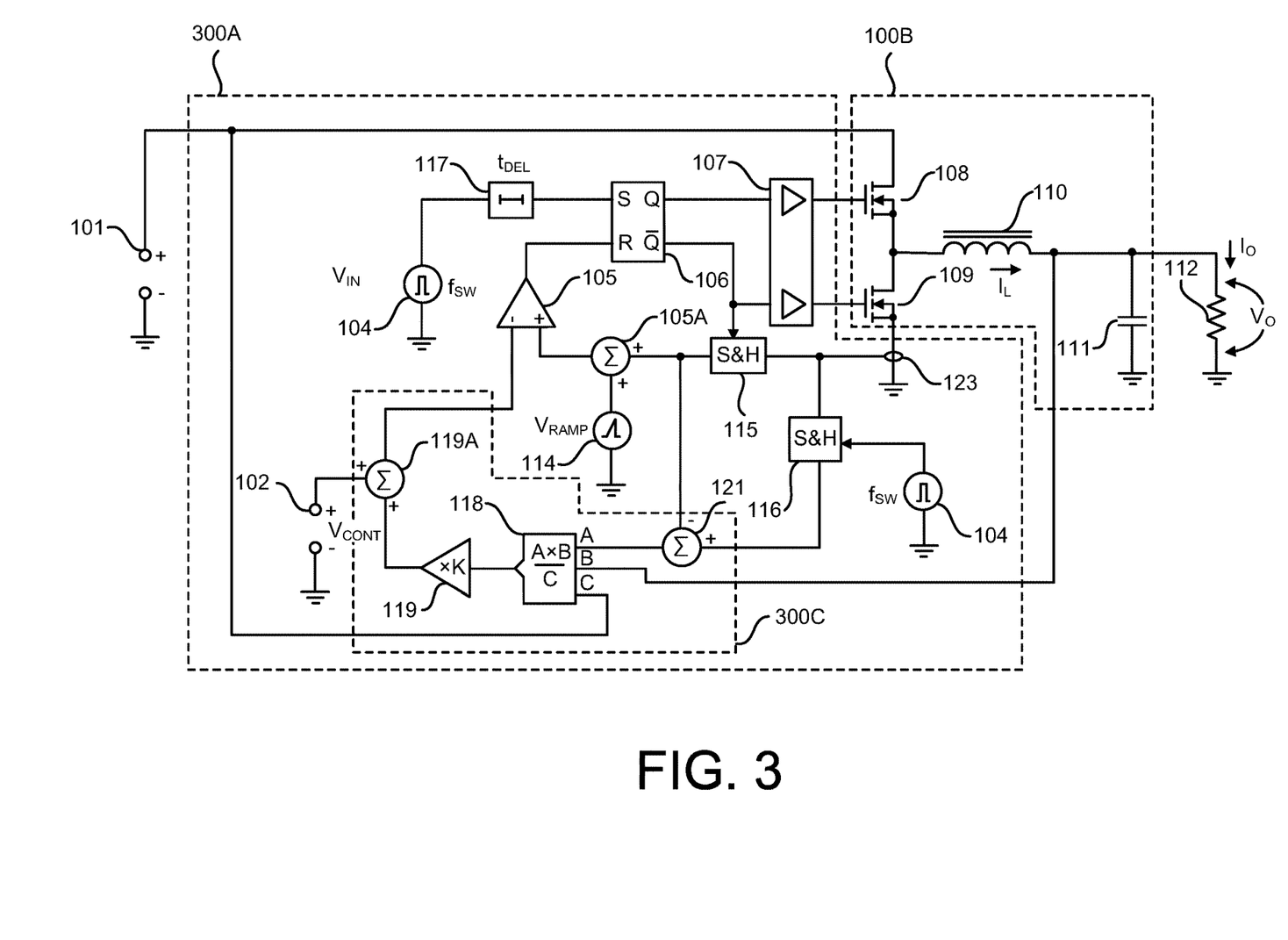
FIG. 3 shows an EPCMC synchronous buck converter device according to an exemplary embodiment.

FIG. 3 shows an EPCMC synchronous buck converter device according to an exemplary embodiment that may resolve the deficiencies of the prior art discussed above. In addition to the components of EPCMC synchronous buck converter device shown in FIG. 2, the EPCM controller 300A of the exemplary converter device of FIG. 3 may additionally include a feedforward circuit 300C that includes a multiplier-divider circuit 118, a gain stage 119, a summation circuit 119A, and a current sense difference circuit 121. The EPCM controller 300A of FIG. 3 may also include a second sample-and-hold circuit 116, and a delay circuit 117 configured to introduce a time delay period $t_{DEL}$ before setting the PWM latch 106 implemented as an SR flip flop. In operation, the oscillator circuit 104 outputs a signal that causes the second sample-and-hold circuit 116 to sample and hold a first current sense voltage generated by the current sense element 123 at a first time preceding the turn-off of the low-side switch 109 by the time delay period $t_{DEL}$. In particular, delay circuit 117 also receives the signal output by the oscillator circuit 104, but delays outputting the signal output by the oscillator circuit 104 to the PWM latch 106 for the time delay period $t_{DEL}$. In response to the delay circuit 117 passing the signal output by the oscillator circuit 104 to the PWM latch 106, the PWM latch 106 outputs signals to the gate driver 107 and to the first sample-and-hold circuit 115 that cause the high-side switch 108 to turn on, the low-side switch 109 to turn off, and the first sample-and-hold circuit 115 to sample and hold a second current sense voltage generated by the current sense element 123 at a second time that is delayed from the first time, but still during the conduction period of the low-side switch 109. According to an exemplary embodiment, the second time may correspond to the end of the conduction period of the low-side switch 109. The second sample-and-hold circuit 116 outputs a first sampled current sense voltage that corresponds to the first current sense voltage generated by the current sense element 123 at the first time. The first sample-and-hold circuit 115 outputs a second sampled current sense voltage that corresponds to the second current sense voltage generated by the current sense element 123 at the second time. The difference between the first and second sampled current sense voltages respectively sampled by the second and first sample-and-hold circuits 116 and 115 is output by current sense difference circuit 121 as voltage differential $\Delta V_S$ and reflects the slew rate of the inductor current $I_L$ downslope, as expressed in Equation 1 below.

$$\frac{dI_L}{dt} = -\frac{\Delta V_S}{R_i t_{DEL}} \quad (1)$$

where $R_i$ is gain of the current sense element 123.

The voltage differential $\Delta V_S$ output by current sense difference circuit 121 is further fed into the input A of the multiplier-divider circuit 118 and multiplied by the ratio of its input voltages B and C. The input B of the multiplier-divider circuit 118 receives the output voltage $V_O$, while the input C of the multiplier-divider circuit 118 receives the input voltage $V_{IN}$. The output of the multiplier-divider circuit 118 is further amplified by the gain stage 119 having gain $K=1/(2f_{SW} \cdot t_{DEL})$, where $f_{SW}$ is the switching frequency. The resulting feedforward voltage $V_{FF}$ is output by the gain stage 119 and added to the current control command voltage $V_{CONT}$ by summation circuit 119A to generate a threshold voltage that may be provided to the inverting input of the comparator 105. Summation circuit 105A sums the second current sense voltage sampled and held by the first sample-and-hold circuit 115 and the ramp voltage $V_{RAMP}$ generated by ramp voltage $V_{RAMP}$ generator 114. Current sense comparator 105 compares the resulting sum of the second current sense voltage and the ramp voltage $V_{RAMP}$ with the sum of the feedforward voltage $V_{FF}$ output by the gain stage 119 and the current control command voltage $V_{CONT}$. When the sum output by the summation circuit 105A exceeds the sum output by summation circuit 119A, the current sense comparator 105 outputs a control signal that causes the PWM latch 106 to reset, which causes the high-side switch 108 to turn off, and the low-side switch 109 to turn on.

The feedforward voltage $V_{FF}$ of the converter device of FIG. 3 that may achieve substantially zero susceptibility to disturbances in $V_{IN}$ can be expressed as shown below in Equation 2:

$$V_{FF} = \frac{1}{2} \frac{T}{t_{DEL}} \cdot \frac{V_O \cdot \Delta V_S}{V_{IN}} \quad (2)$$

where $T=1/f_{SW}$, i.e. the switching period of the oscillator circuit 104. The peak-to-average current sense error may be represented as $\frac{1}{2}T^*(1-D)^*dVs/dt$, where $D=V_O/V_{IN}$. Because $dVs/dt=V_O*R_i/L=\text{const}(V_{IN})$, only the term proportional to D affects $dV_O/dV_{IN}$. Hence, offsetting the current control command by $\frac{1}{2}T^*(V_O/V_{IN})^*dVs/dt$ removes dependency on $V_{IN}$.

Offsetting the feedforward voltage $V_{FF}$ by any arbitrary constant voltage also produces the same feedforward characteristic. By sampling the current sense voltage twice, spaced by the time delay period $t_{DEL}$, the dependency on the $R_i/L$ ratio can be reduced or eliminated. The voltage differential $\Delta V_S$ between the two sampled current sense voltages is a measure of $R_i/L$ which allows the use of a feedforward voltage $V_{FF}$ that is unaffected by component tolerances.

According to an exemplary embodiment, it may be more convenient from a circuit implementation prospective to obtain $V_{FF}<0$ under all operating conditions. Hence, the voltage differential $\Delta V_S$ can be subtracted from the output voltage of the multiplier-divider circuit 118 without any substantial sacrifice in performance, which affects the feedforward voltage $V_{FF}$ as represented in Equation 3 below.

$$V_{FF} = -\frac{1}{2} \frac{T}{t_{DEL}} \cdot \Delta V_S \left(1 - \frac{V_O}{V_{IN}}\right) \quad (3)$$

Figure 4:
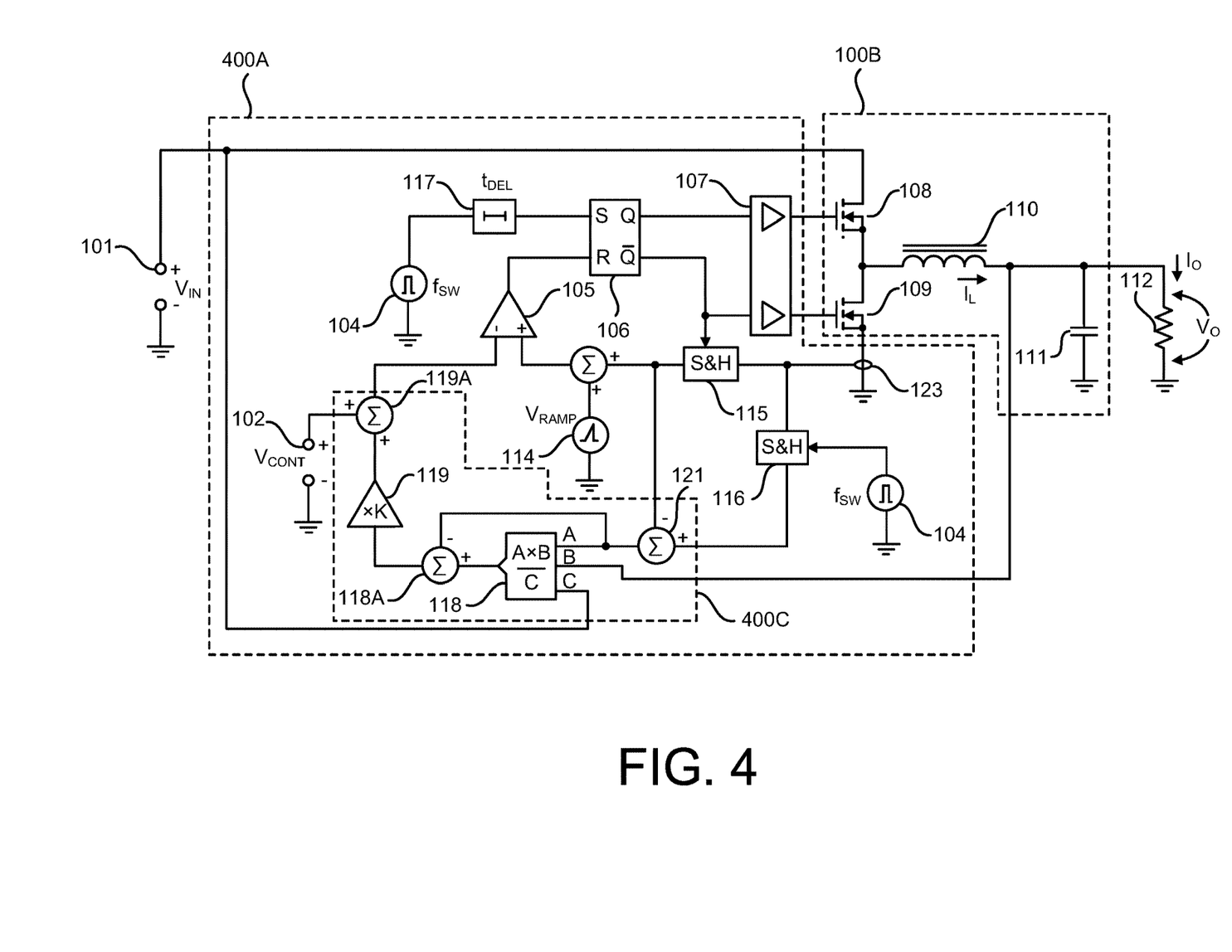
FIG. 4 shows an EPCMC synchronous buck converter device according to another exemplary embodiment.

The embodiment of Equation 3 is illustrated in FIG. 4 which shows an EPCMC synchronous buck converter device according to an exemplary embodiment that includes a controller 400A having a feedforward circuit 400C. In the feedforward circuit 400C, the voltage differential $\Delta V_S$, which is provided to input A of the multiplier-divider circuit 118, is subtracted from the output voltage of the multiplier-divider circuit 118 by a feedforward difference circuit 118A. The difference between the output voltage of the multiplier-divider circuit 118 and the voltage differential $\Delta V_S$ output by feedforward difference circuit 118A is input to the gain stage 119, where it is amplified and provided to summation circuit 119A for summing with the current control command voltage $V_{CONT}$ to generate the threshold voltage for current sense comparator 105.

Figure 5:
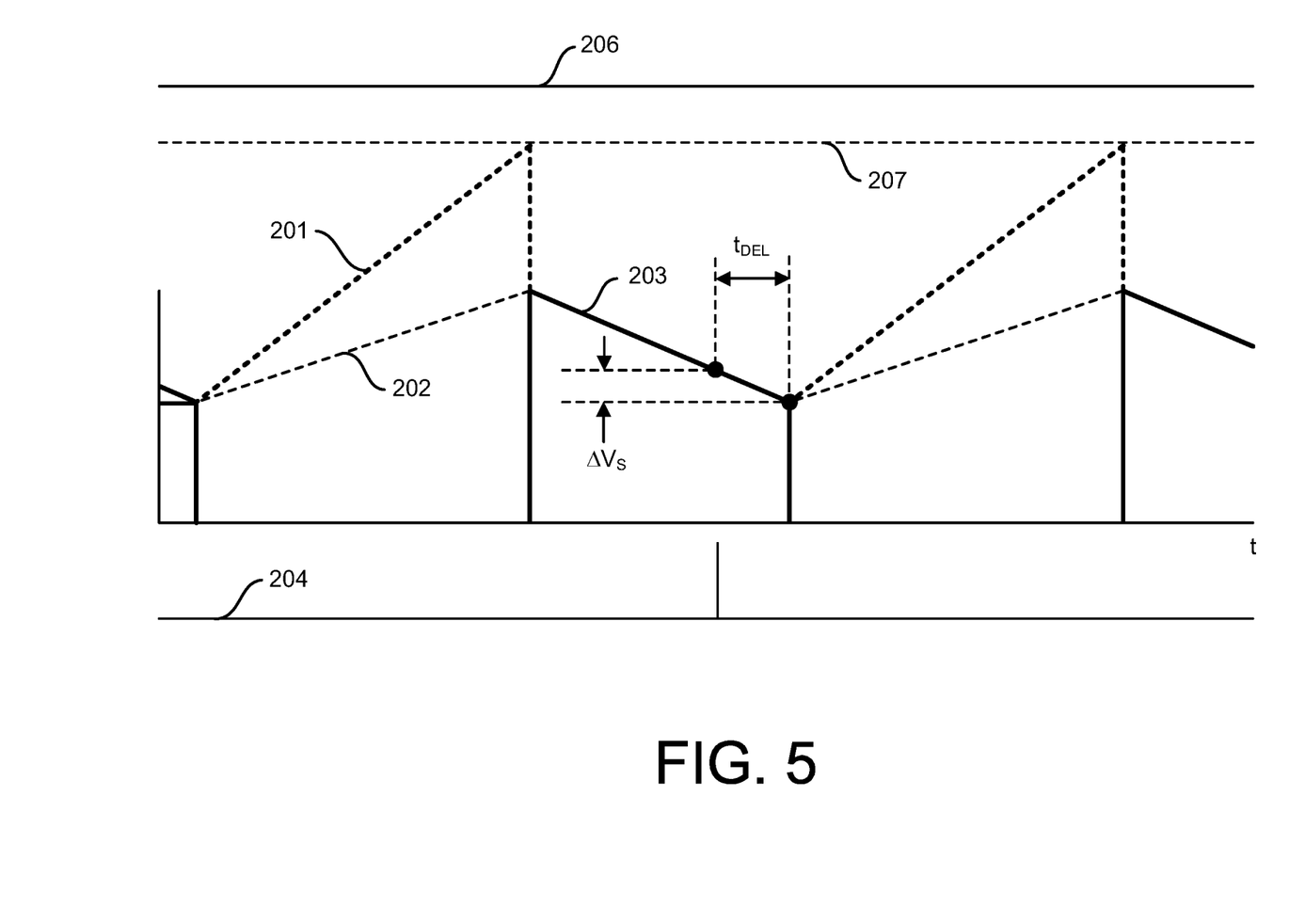
FIG. 5 shows a waveform diagram of the EPCMC synchronous buck converter device according to the exemplary embodiment of FIG. 4.

FIG. 5 illustrates the operating principles of the exemplary EPCMC synchronous buck converter device of FIG. 4. In FIG. 5, waveform 202 represents the rising slope of the inductor current $I_L$ multiplied by $R_i$, the gain of the current sense element 123, while the high-side switch 108 is conducting and the low-side switch 109 is turned off. Waveform 203 is the current sense voltage output by the current sense element 123 while the low-side switch 109 is conducting and the high-side switch 108 is turned off. Waveform 201 represents the emulated ramp signal output by summation circuit 105A and provided to the non-inverting input of the current sense comparator 105. Voltage level 206 is the current control command voltage $V_{CONT}$. Voltage level 207 is the resulting threshold voltage fed to the inverting input of the current sense comparator 105 produced by summation circuit 119A, composed as a sum of the current control command voltage $V_{CONT}$ and the feedforward voltage VF given by equation (3). The signal 204 represents the clock pulses of the oscillator circuit 104 generated at the switching frequency $f_{SW}$. The voltage differential $\Delta V_S$ is generated as a difference of the current sense signal 203 taken before and after the time delay period $t_{DEL}$.

Figure 6:
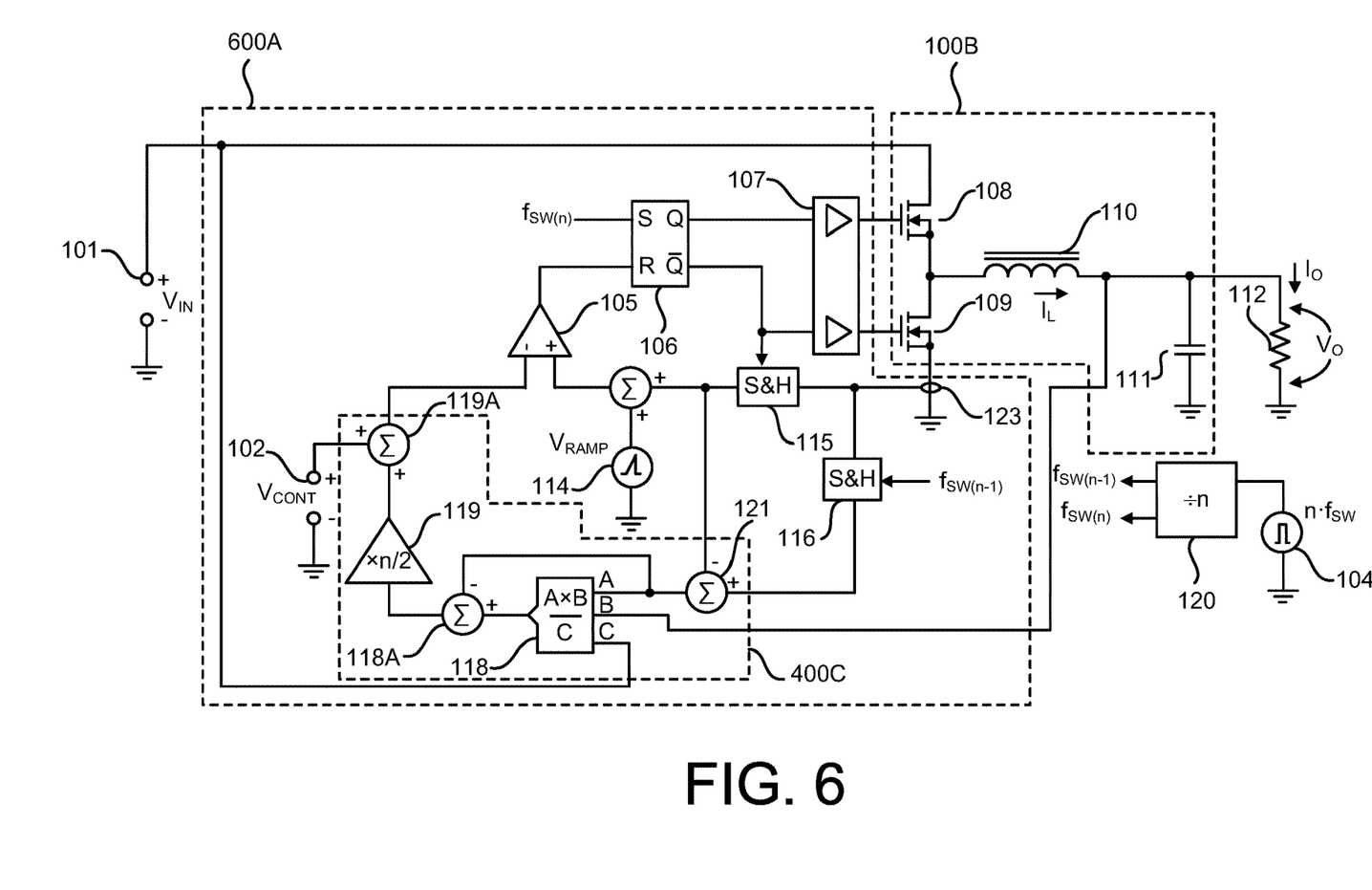
FIG. 6 shows an EPCMC synchronous buck converter device according to yet another exemplary embodiment.

The time delay period $t_{DEL}$ can be accurately generated as a fraction 1/n of the switching period T. FIG. 6 depicts a EPCMC synchronous buck converter device according to an exemplary embodiment having an EPCM controller 600A wherein the oscillator circuit 104 operates at frequency $n*f_{SW}$, where n is an integer number that may be much greater than 1. In the EPCMC synchronous buck converter device of FIG. 6, the delay circuit 117 is embodied as a frequency divider 120 configured to generate taps $f_{SW(n-1)}$ and $f_{SW(n)}$ substantially coinciding with the $(n-1)^{th}$ and $n^{th}$ clocks of the oscillator circuit 104, respectively. Accordingly, the feedforward voltage VF can be represented by Equation 4 below:

$$V_{FF} = -\frac{n}{2} \cdot \Delta V_S \left(1 - \frac{V_O}{V_{IN}}\right) \quad (4)$$

Figure 7:
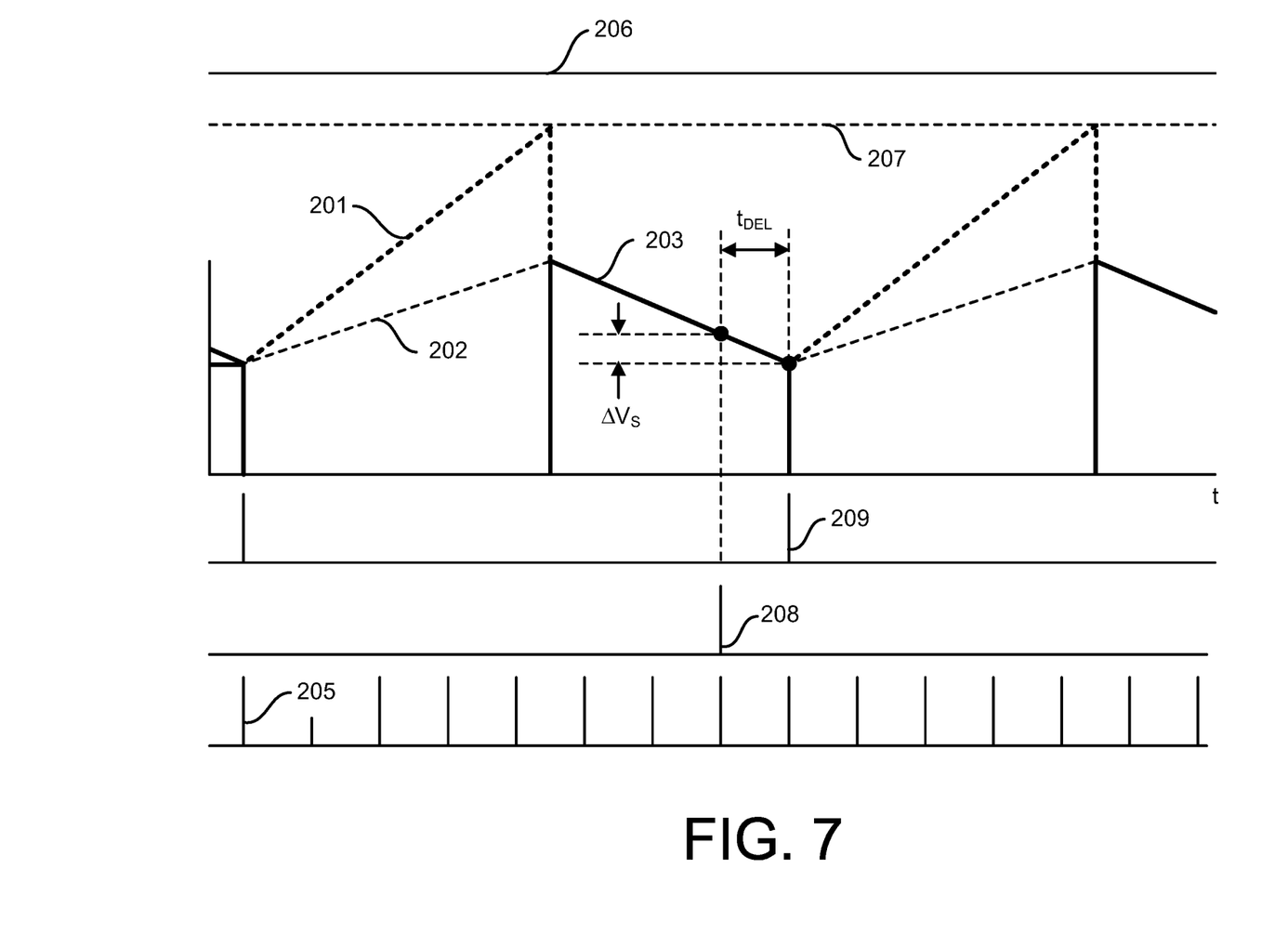
FIG. 7 shows a waveform diagram of the EPCMC synchronous buck converter device according to the exemplary embodiment of FIG. 6.

FIG. 7 illustrates operation of the EPCMC synchronous buck converter device of FIG. 6. In FIG. 7, waveform 202 represents the rising slope of the inductor current $I_L$ multiplied by $R_i$, the gain of the current sense element 123, while the high-side switch 108 is conducting and the low-side switch 109 is turned off. Waveform 203 is the current sense voltage generated by the current sense element 123 while the low-side switch 109 is conducting and the high-side switch 108 is turned off. Waveform 201 is the emulated ramp signal output by summation circuit 105A and provided to the non-inverting input of the current sense comparator 105. Voltage level 206 is the current control command voltage $V_{CONT}$. Voltage level 207 is the resulting threshold voltage fed to the inverting input of the current sense comparator 105, composed as a sum of the current control command voltage $V_{CONT}$ and the feedforward voltage $V_{FF}$ given by equation (4). The signal 205 represents the clock pulses of the oscillator circuit 104 generated at the frequency $n \cdot f_{SW}$. The signals 208 and 209 represent the taps $f_{SW(n-1)}$ and $f_{SW(n)}$ of the frequency divider 120, respectively.

Figure 8:
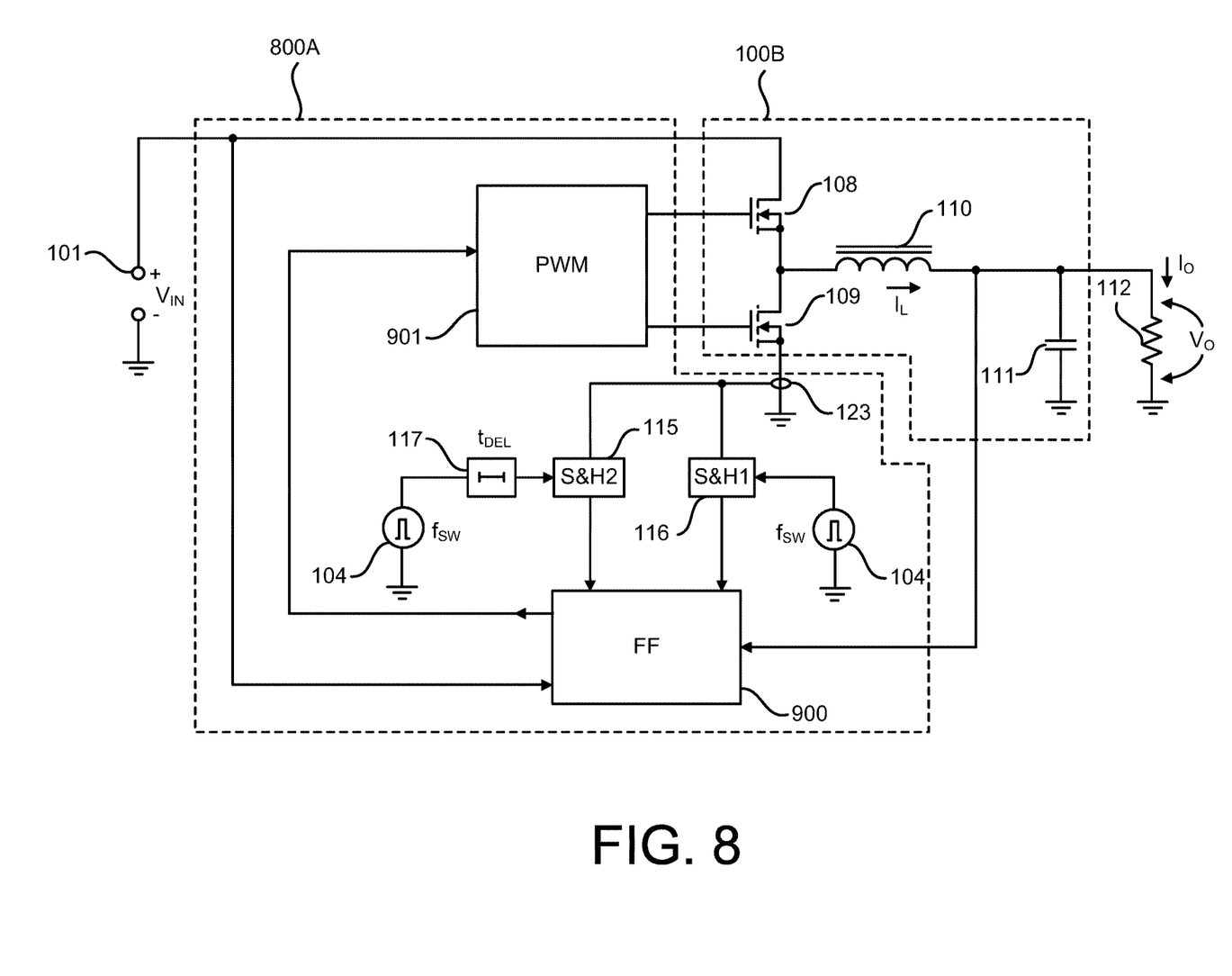
FIG. 8 shows an EPCMC synchronous buck converter device according to an exemplary embodiment.

FIG. 8 depicts an EPCMC synchronous buck converter device according to an exemplary embodiment, which includes an EPCM controller 800A and the synchronous buck converter 100B from FIG. 1. The EPCM controller 800A includes a current sense element 123 that outputs a current sense voltage based on the inductor current $I_L$ in the inductor 110. Oscillator circuit 104 outputs a signal that causes the second sample-and-hold circuit 116 to sample and hold a first current sense voltage generated by the current sense element 123 at a first time preceding the turn-off of the low-side switch 109 by the time delay period $t_{DEL}$, and output a first sampled current sense voltage. The delay circuit 117 also receives the signal output by the oscillator circuit 104, but delays outputting the signal output by the oscillator circuit 104 to the first sample-and-hold circuit 115. In response to the delay circuit 117 passing the signal output by the oscillator circuit 104 to the first sample-and-hold circuit 115, the first sample-and-hold circuit 115 samples and holds a second current sense voltage generated by the current sense element 123 at a second time that is delayed from the first time, but still during the conduction period of the low-side switch 109, and outputs a second sampled current sense voltage.

Figure 9:
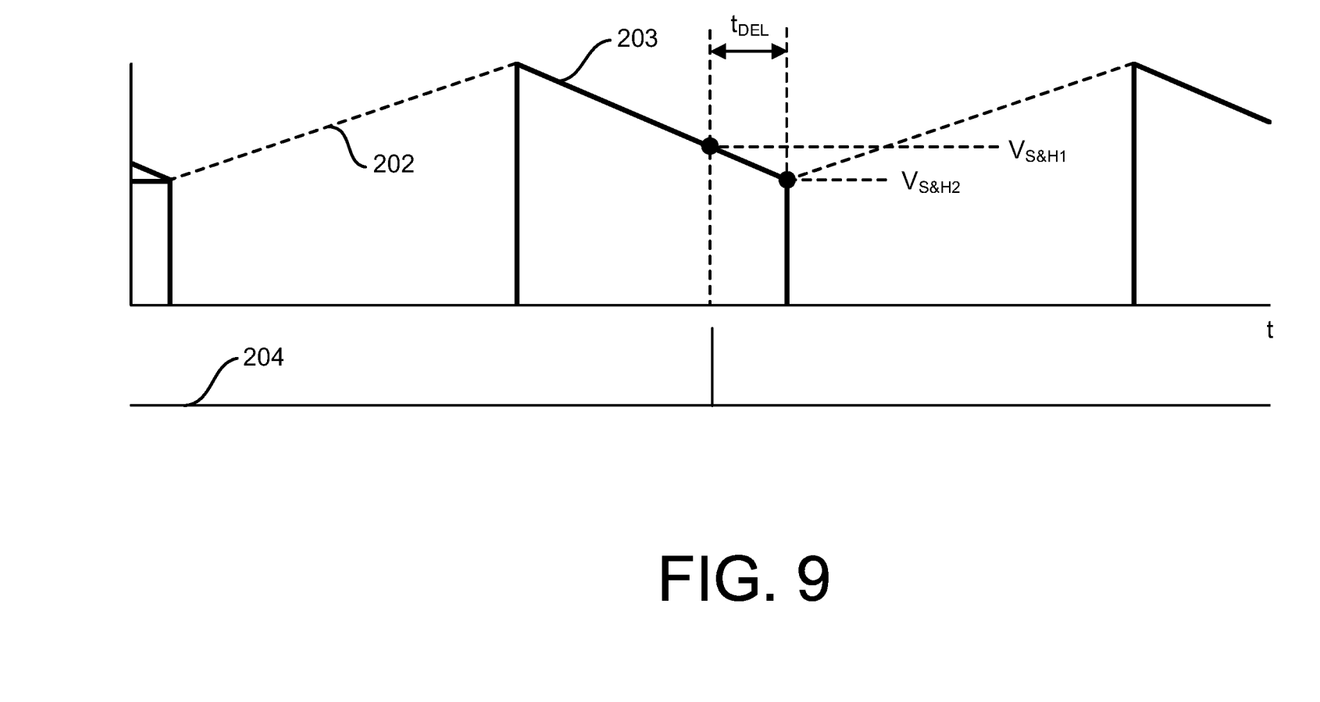
FIG. 9 shows a waveform diagram of the EPCMC synchronous buck converter device according to the exemplary embodiment of FIG. 8.

The EPCM controller 800A includes a feedforward circuit 900 that receives the first sampled current sense voltage output by the second sample-and-hold circuit 116 and the second sampled current sense voltage output by the first sample-and-hold circuit 115, and generates a feedforward voltage VF based on a voltage differential $\Delta V_S$ that represents the difference between the first current sense voltage and the second current sense voltage. In this exemplary embodiment, the first current sense voltage is the first sampled current sense voltage and the second current sense voltage is the second sampled current sense voltage. The controller 800A further includes a pulse width modulation (PWM) latch 901 that receives the feedforward voltage VF and alternately turns on and off the high-side switch 108 and the low-side switch 109, respectively, based on the feedforward voltage VF. FIG. 9 illustrates the operating principles of the exemplary EPCMC synchronous buck converter device of FIG. 8. In FIG. 9, waveform 202 represents the rising slope of the inductor current $I_L$ multiplied by $R_i$, the gain of the current sense element 123, while the high-side switch 108 is conducting and the low-side switch 109 is turned off. Waveform 203 is the current sense voltage output by the current sense element 123 while the low-side switch 109 is conducting and the high-side switch 108 is turned off. The signal 204 represents the clock pulses of the oscillator circuit 104 generated at the switching frequency $f_{SW}$. The voltage differential $\Delta V_S$ is generated as a difference of the current sense signal 203 taken before ($V_{S\&H1}$) and after ($V_{S\&H2}$) the time delay period $t_{DEL}$.

Although the exemplary embodiments discussed above have been described in the context of automotive or industrial applications, the exemplary embodiments are not limited to such applications and can apply to many other applications.

Many different embodiments have been disclosed herein, in connection with the above description and the drawings. It will be understood that it would be unduly repetitious to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An emulated peak current mode control (EPCMC) synchronous buck converter device comprising:
    a converter configured to receive an input voltage and generate an output voltage, said converter comprising an inductor, a high-side switch, and a low-side switch, wherein said high-side switch and said low-side switch are coupled to, and are configured to control an inductor current through said inductor; and
    an emulated peak current mode (EPCM) controller comprising:
        a pulse width modulation (PWM) latch configured to alternately turn on and off said high-side and low-side switches, respectively;
        a current sense element configured to output a current sense voltage based on the inductor current through the inductor; and
        a feedforward circuit configured to generate a feedforward voltage;
        wherein the current sense element is configured to output a first current sense voltage at a first time while the low-side switch is turned on, and output a second current sense voltage at a second time while the low-side switch is turned on, the second time being delayed from the first time;
        wherein said feedforward circuit is configured to generate said feedforward voltage based on a voltage differential that represents a difference between said first current sense voltage and said second current sense voltage; and
        wherein said PWM latch is configured to alternately turn on and off said high-side and low-side switches, respectively, based on said feedforward voltage.

2. The EPCMC synchronous buck converter device of claim 1, wherein the EPCM controller further comprises:
    a ramp voltage generator configured to generate a ramp voltage;
    a current control command voltage source configured to generate a current control command voltage; and a current sense comparator that compares a sum of said ramp voltage and said second current sense voltage with a sum of said feedforward voltage and said current control command voltage, and outputs a control signal to said PWM latch based on said comparison;

wherein said PWM latch is configured to alternately turn on and off said high-side and low-side switches based on said control signal output by the current sense comparator.

3. The EPCMC synchronous buck converter device of claim 2, wherein the EPCM controller further comprises:
a multiplier-divider circuit configured to output a signal representing said voltage differential multiplied by a ratio of said output voltage to said input voltage; and
a gain stage configured to amplify said output of said multiplier-divider circuit to generate said feedforward voltage.

4. The EPCMC synchronous buck converter device of claim 2, wherein the controller further comprises:
a multiplier-divider circuit configured to output a signal representing said voltage differential multiplied by a ratio of said output voltage to said input voltage;
a feedforward difference circuit configured to output a difference between said voltage differential and said output of said multiplier-divider circuit; and
a gain stage configured to amplify said difference between said voltage differential and said output of said multiplier-divider circuit to generate said feedforward voltage.

5. The EPCMC synchronous buck converter device of claim 1, wherein the EPCM controller further comprises:
a multiplier-divider circuit configured to output a signal representing said voltage differential multiplied by a ratio of said output voltage to said input voltage; and
a gain stage configured to amplify said output of said multiplier-divider circuit to generate said feedforward voltage.

6. The EPCMC synchronous buck converter device of claim 1, wherein the EPCM controller further comprises:
a first sample-and-hold circuit configured to sample said first current sense voltage at said first time and output a first sampled current sense voltage;
a second sample-and-hold circuit configured to sample said second current sense voltage at said second time and output a second sampled current sense voltage;
a current sense difference circuit configured to output the voltage differential as the difference between the first sampled current sense voltage and the second sampled current sense voltage; and
a delay circuit configured to delay said sampling of said second current sense voltage by a time delay period following said sampling of said first current sense voltage.

7. The EPCMC synchronous buck converter device of claim 6, further comprising:
an oscillator circuit configured to generate a series of clock pulses;
wherein said delay circuit comprises a frequency divider configured to receive said series of clock pulses and generate a first frequency tap signal corresponding to a first clock pulse of said series of clock pulses, and a second frequency tap signal corresponding to a second clock pulse of said series of clock pulses;
wherein said first sample-and-hold circuit is configured to sample said first current sense voltage in response to said first frequency tap signal; and wherein said second sample-and-hold circuit is configured to sample said second current sense voltage in response to said second frequency tap signal.

8. An emulated peak current mode (EPCM) controller for controlling a synchronous buck converter configured to receive an input voltage and generate an output voltage, and having an inductor, a high-side switch, and a low-side switch, said EPCM controller comprising:
a pulse width modulation (PWM) latch configured to alternately turn on and off said high-side and low-side switches, respectively;
a current sense element configured to output a current sense voltage based on an inductor current through the inductor; and
a feedforward circuit configured to generate a feedforward voltage;
wherein the current sense element is configured to output a first current sense voltage at a first time while the low-side switch is turned on, and output a second current sense voltage at a second time while the low-side switch is turned on, the second time being delayed from the first time;
wherein said feedforward circuit is configured to generate said feedforward voltage based on a voltage differential that represents a difference between said first current sense voltage and said second current sense voltage; and
wherein said PWM latch is configured to alternately turn on and off said high-side and low-side switches based on said feedforward voltage.

9. The EPCM controller of claim 8 further comprising:
a ramp voltage generator configured to generate a ramp voltage;
a current control command voltage source configured to generate a current control command voltage; and
a current sense comparator that compares a sum of said ramp voltage and said second current sense voltage with a sum of said feedforward voltage and said current control command voltage, and outputs a control signal to said PWM latch based on said comparison;
wherein said PWM latch is configured to turn on and off said high-side and low-side switches based on said control signal output by the current sense comparator.

10. The EPCM controller of claim 9 further comprising:
a multiplier-divider circuit configured to output a signal representing said voltage differential multiplied by a ratio of said output voltage to said input voltage; and
a gain stage configured to amplify said output of said multiplier-divider circuit to generate said feedforward voltage.

11. The EPCM controller of claim 9 further comprising:
a multiplier-divider circuit configured to output a signal representing said voltage differential multiplied by a ratio of said output voltage to said input voltage;
a feedforward difference circuit configured to output a difference between said voltage differential and said output of said multiplier-divider circuit; and
a gain stage configured to amplify said difference between said voltage differential and said output of said multiplier-divider circuit to generate said feedforward voltage.

12. The EPCM controller of claim 8 further comprising:
a multiplier-divider circuit configured to output a signal representing said voltage differential multiplied by a ratio of said output voltage to said input voltage; and a gain stage configured to amplify said output of said multiplier-divider circuit to generate said feedforward voltage.

13. The EPCM controller of claim 8 further comprising:
a first sample-and-hold circuit configured to sample said first current sense voltage at said first time and output a first sampled current sense voltage;
a second sample-and-hold circuit configured to sample said second current sense voltage at said second time and output a second sampled current sense voltage;
a current sense difference circuit configured to output the voltage differential as the difference between the first sampled current sense voltage and the second sampled current sense voltage; and
a delay circuit configured to delay said sampling of said second current sense voltage by a time delay period following said sampling of said first current sense voltage.

14. The EPCM controller of claim 13 further comprising:
an oscillator circuit configured to generate a series of clock pulses;
wherein said delay circuit comprises a frequency divider configured to receive said series of clock pulses and generate a first frequency tap signal corresponding to a first clock pulse of said series of clock pulses, and a second frequency tap signal corresponding to a second clock pulse of said series of clock pulses;
wherein said first sample-and-hold circuit is configured to sample said first current sense voltage in response to said first frequency tap signal; and
wherein said second sample-and-hold circuit is configured to sample said second current sense voltage in response to said second frequency tap signal.

15. An emulated peak current mode control (EPCMC) method of controlling a synchronous buck converter configured to receive an input voltage and generate an output voltage, and having an inductor, a high-side switch, and a low-side switch, said EPCMC method comprising:
generating a pulse width modulation (PWM) signal to alternately turn on and off said high-side and low-side switches;
outputting a first current sense voltage based on an inductor current through the inductor at a first time while the low-side switch is turned on;
outputting a second current sense voltage based on an inductor current through the inductor at a second time while the low-side switch is turned on, the second time being delayed from the first time; and
generating a feedforward voltage based on a voltage differential that represents a difference between said first current sense voltage and said second current sense voltage,
wherein said PWM signal is generated based on said feedforward voltage.

16. The EPCMC method of claim 15 further comprising:
generating a ramp voltage;
generating a current control command voltage;
comparing a sum of said ramp voltage and said second current sense voltage with a sum of said feedforward voltage and said current control command voltage; and
outputting a control signal based on said comparison;
wherein said PWM signal is generated based on said control signal.

17. The EPCMC method of claim 16 further comprising:
multiplying said voltage differential by a ratio of said output voltage to said input voltage; and
amplifying a result of said multiplying to generate said feedforward voltage.

18. The EPCMC method of claim 16 further comprising:
multiplying said voltage differential by a ratio of said output voltage to said input voltage;
subtracting said voltage differential from a result of said multiplying; and
amplifying a result of said subtracting to generate said feedforward voltage.

19. The EPCMC method of claim 15 further comprising:
multiplying said voltage differential by a ratio of said output voltage to said input voltage; and
amplifying a result of said multiplying to generate said feedforward voltage.

20. The EPCMC method of claim 15 further comprising:
sampling said first current sense voltage at said first time and outputting a first sampled current sense voltage; and
sampling said second current sense voltage at said second time and outputting a second sampled current sense voltage;
outputting said voltage differential as the difference between said first sampled current sense voltage and said second sampled current sense voltage,
wherein said sampling of said second current sense voltage is delayed by a time delay period following said sampling of said first current sense voltage.

21. The EPCMC method of claim 20 further comprising:
generating a series of clock pulses;
generating a first frequency tap signal corresponding to a first clock pulse of said series of clock pulses; and
generating a second frequency tap signal corresponding to a second clock pulse of said series of clock pulses,
wherein said sampling said first current sense voltage comprises sampling said first current sense voltage in response to said first frequency tap signal; and
wherein said sampling said second current sense voltage comprises sampling said second current sense voltage in response to said second frequency tap signal.

* * * * *